(12) United States Patent
Hussain

(10) Patent No.: US 7,396,208 B1
(45) Date of Patent: Jul. 8, 2008

(54) DIVIDED BLADE ROTOR

(76) Inventor: Mahmood H. Hussain, Abu Neas Street, Baghdad (IQ)

( * ) Notice: Subject to any disclaimer, the term of this patent is extended or adjusted under 35 U.S.C. 154(b) by 394 days.

(21) Appl. No.: 11/351,073

(22) Filed: Feb. 9, 2006

Related U.S. Application Data

(60) Provisional application No. 60/652,938, filed on Feb. 15, 2005.

(51) Int. Cl.
*F04D 29/38* (2006.01)
*F01D 5/14* (2006.01)
*B64C 11/16* (2006.01)

(52) U.S. Cl. .................. 416/91; 416/227 A; 416/231 R

(58) Field of Classification Search .................. 416/91, 416/227 A, 227 R, 231 A, 231 B, 231 R, 416/DIG. 3; 415/181
See application file for complete search history.

(56) References Cited

U.S. PATENT DOCUMENTS

| 285,212 | A | * | 9/1883 | Bell et al. | ............... 416/227 A |
| 1,066,988 | A | * | 7/1913 | Boutwell | ............... 416/231 R |
| 2,938,662 | A | * | 5/1960 | Eckert et al. | ............ 416/231 R |
| 3,044,559 | A | * | 7/1962 | Chajmik | ................ 416/231 R |

FOREIGN PATENT DOCUMENTS

EP          295 353 B1     12/1988

* cited by examiner

*Primary Examiner*—Richard Edgar
(74) *Attorney, Agent, or Firm*—Sven W. Hanson

(57) ABSTRACT

A novel rotor blade is presented with an integral tip portion from which two diverging blade portions extend to separated respective roots. The blade may have conventional airfoil sections, or may be made from flat or curved sheet material. The two rotor blade portions may have dissimilar angles of incidence. Leading edge holes or slots are located behind the leading edge of the blade. The two blade portions may have distinct angles of incidence.

12 Claims, 5 Drawing Sheets

DIVIDED BLADE ROTOR

RELATED APPLICATIONS

This application incorporates by reference the disclosure of, and claims priority from, the U.S. Provisional Patent application filed Feb. 15, 2005 and having Ser. No. 60/652,938.

BACKGROUND OF THE INVENTION

The present invention relates generally to rotor and propeller blades and similar devices that are used to move a fluid medium, to move in a fluid medium, or to be moved by a fluid medium. More particularly, the invention concerns a divided rotor blade having a single integral tip and two discrete blade portions that can operate at a high angle of incidence, and which has integral leading edge holes or ports to allow medium passage through the rotor body and across the rotor chord to delay or prevent cavitation, turbulence, and stalling.

DISCUSSION OF THE PRIOR ART

Conventional rotor and propeller blades are typically supported by a single root portion and operate effectively only at subsonic tip speeds. They are generally subject to flutter at transonic and supersonic tip speeds resulting in cavitation, accelerated stalling and loss of function, often followed by sudden catastrophic failure. Most conventional rotor and propeller blades are relatively long and are entirely unsupported along their length. Accordingly, they must have relatively large root sections in part to obtain sufficient strength to prevent bending and twisting in ordinary use. In part to reduce weight, conventional rotor and propeller blades have a chord length which is decreased significantly in the tip, where relatively little thrust is produced as a result. Conventional rotor and propeller blades are also relatively noisy, and the wasted acoustic energy represents a significant inefficiency.

A prior divided rotor blade is taught in EPC Patent Number EP0295353 issued to al Majed. The al Majed device is made from a single piece of flat sheet material and has divided rotor blade portions and separated blade roots (see FIG. 1 herein). The blade portion roots are oriented relatively axially displaced on a shaft such that one blade portion leads the other. Angled leading and trailing edges are intended to enhance laminar flow and increase lift. The blade portions are not twisted and have a common angle of incidence. While the al Majed rotor blade operates efficiently, and is superior to conventional blades in several respects, such as stall resistance, quietness, strength, lightness and ease of manufacture, it operates with a higher degree of drag than is desirable, and it is subject to cavitation, turbulence, and accelerated stalling when operated at high speeds and high angles of incidence.

Accordingly, a need has arisen for an improved rotor blade having the advantages of a divided rotor blade, but which operates with a lower degree of drag, and which is less subject to cavitation, turbulence, and accelerated stalling when operated at high speeds and high angles of incidence.

SUMMARY OF THE INVENTION

The present invention is a rotor blade having two distinct blade portions with respective roots which are separated from each other. The blade portions extend convergingly from their roots to join at a common tip. In use, operating medium flows through the gap formed between the blade portion, and through holes in the lead blade portion, providing improved performance. In preferred embodiments providing significantly reduced cost of manufacture, a divided blade rotor is formed from flat sheet metal. The present invention includes methods of forming a rotor blade from sheet material.

A first object of the present invention is a simplified design, and improved operation, divided rotor blade that can be formed from flat sheet material.

A second object of the invention is a divided rotor blade comprising true airfoil sections in tip and root to decrease drag and increase effective lift or thrust.

A third objective of the invention is a rotor blade which can be operated effectively at supersonic tip speeds.

A fourth object of the invention a rotor blade which is resistant to cavitation, turbulence, and accelerated stalling otherwise initiated by high speed operation at a high angle of incidence.

A fifth object of the invention is a divided rotor blade with root portions having dissimilar angles of incidence.

In various embodiments, a single metallic sheet is split partially through its length to form two blade portions joined at a common tip portion. The blade is permanently bent to displace one blade portion out of the plane of the other to form a generally tapered gap therebetween. One blade portion is angled or twisted to change its angle of action relative to the other blade portion thereby critically effecting cavitation, lift, and stall characteristics of the entire blade. One blade portion, to be mounted as a lead blade, includes a leading edge portion bent to decrease the angle of attack. A series of holes are located behind the leading edge. In various configurations, the trailing blade portion may include a bent trailing edge portion.

Methods of forming the inventive blade include forming and joining processes that result in the same geometry as suggested for forming by bending sheet material. Other benefits and novel aspects of the invention will become apparent from the following description of various particular embodiments and the accompanying figures.

DESCRIPTION OF THE PREFERRED EMBODIMENTS

Figure 1A:
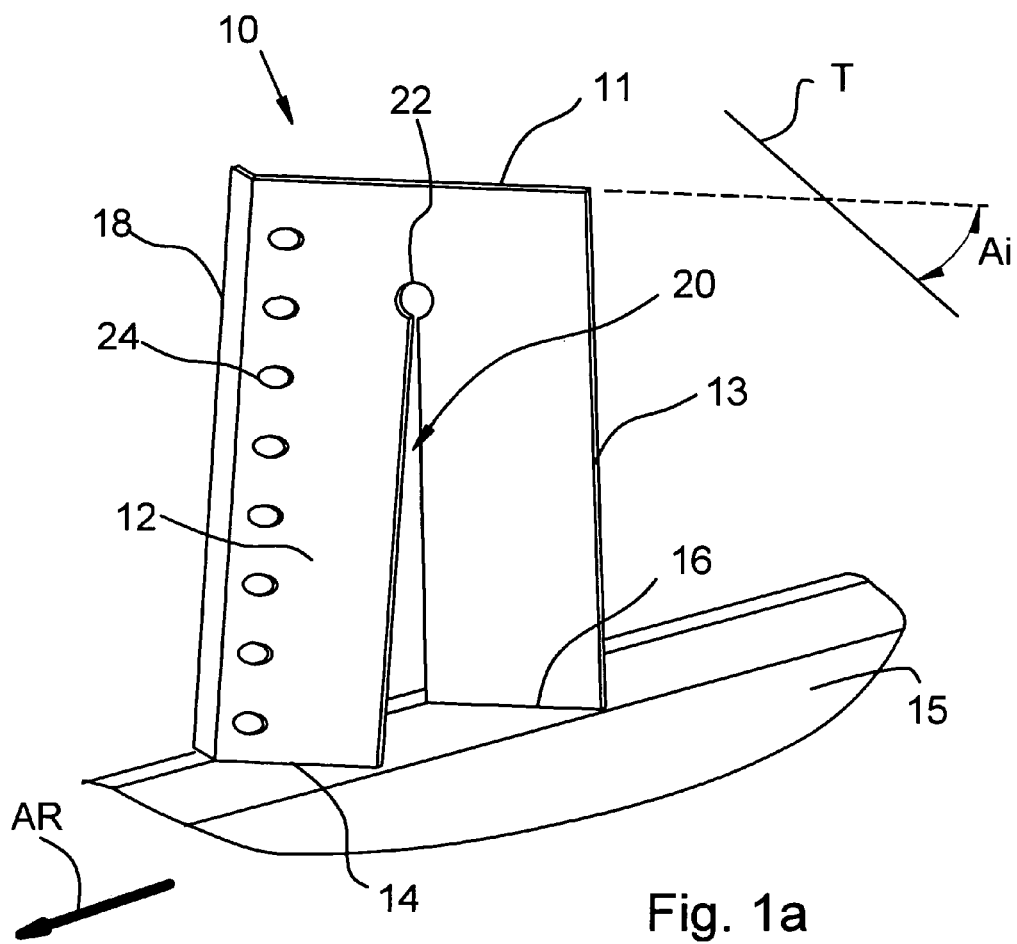
FIG. 1a is a perspective view of a first preferred embodiment of the present inventive rotor blade mounted on a shaft.
Figure 1B:
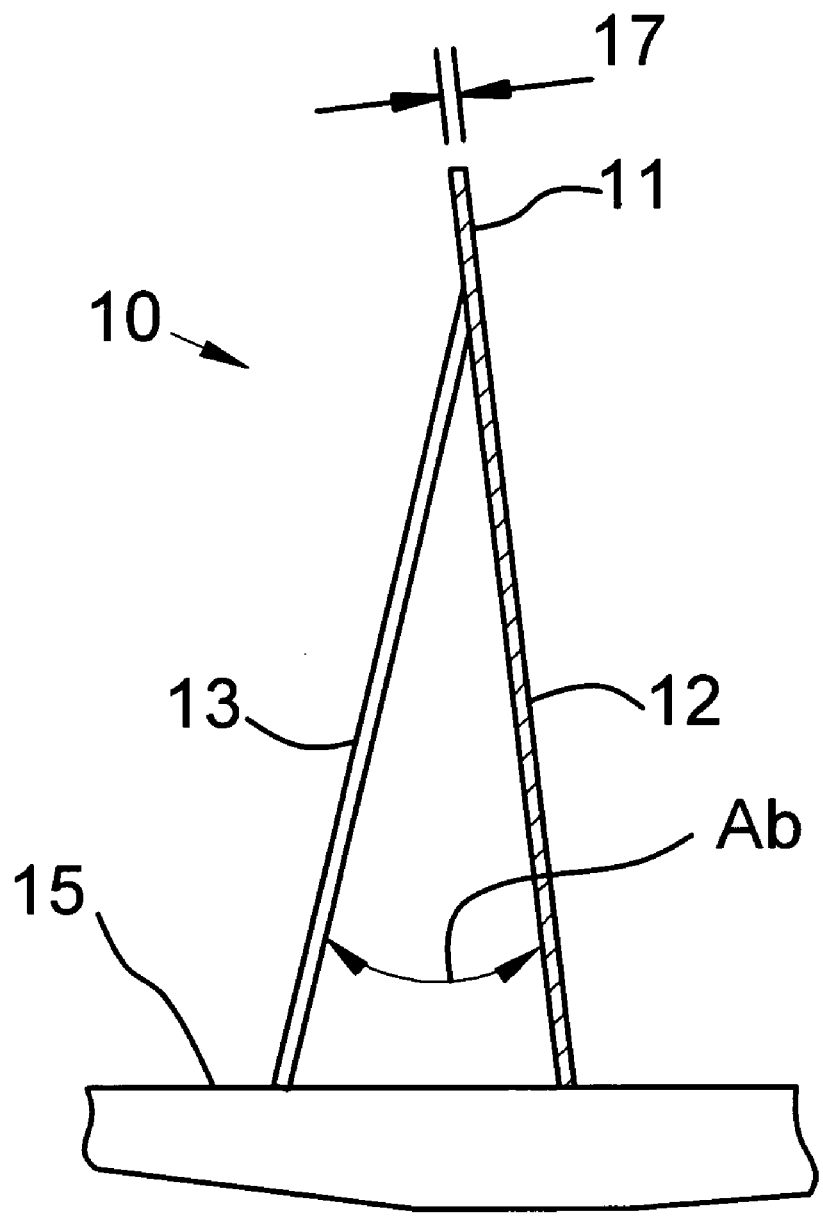
FIG. 1b is a horizontal section view, of the same embodiment, through the leading blade portion and looking toward the trailing blade portion.

FIG. 1a is a perspective view of a preferred embodiment of the invention. A rotor blade 10 is formed from flat sheet material for simplicity and economy. Here, the term "flat" is intended to mean having a uniform thickness to the degree typically found in commercial stock sheet steel. The flat sheet is divided or split longitudinally, leaving an undivided tip portion 11. The divided sheet forms a leading blade portion 12 and a trailing blade portion 13, extending from the tip portion 11 to respective blade roots 14, 16. The leading blade portion 12 and tip portion 11 remain in a common plane, while the trailing blade portion 13 is angled from the tip out of the plane to form an angled gap 20 between the blade portions. This angle of the trailing blade portion, out of the plane of the tip portion 11 and leading blade portion 12, is preferably 20 (twenty) degrees. The relative orientation of the leading and trailing blade portions 12, 13 and the included trailing blade angle Ab between them is depicted in FIG. 1b. This trailing blade angle Ab may be other than 20 degrees in various applications. The optimum angle for a specific application may be determined experimentally. FIG. 1b is a section view through the leading blade portion of the embodiment of FIG. 1a, looking toward the trailing blade portion. Because the blade portions are parallel, only their respective edges are seen. The hub 15 to which the rotor blade 10 is mounted is seen at an oblique angle. The uniform rotor blade thickness 17 can be seen in this view. In configurations using airfoils or other non-uniform thickness blade geometries, the location of the trailing blade portion root can be defined by its relative displacement perpendicular to the first blade portion root chord to provide the same effective gap angle. The size of the tip portion 11 is not aerodynamically critical as the tip portion is provided primarily as a structural support of the outer extents of the blade portions 12, 13—securing them together. In alternative configurations, the tip portion 11 may have a thicker section allowing reduced area while providing the same effective bending and shear strength and rigidity.

In forming the blade portions, the sheet material is bent at the intersection of the tip portion 11 and the two blade portions to allow the blade portions to remain substantially straight and planar. In operation, the gap 20 functions to accelerate the fluid flow between the leading and trailing blade portions 12, 13, progressively as the gap narrows toward the tip portion 11. At the point of the gap 20, a stress relief hole 22 is provided. The necessary size of the stress relief hole 22 is dependent upon the final desired size and shape of the rotor blade 10, and the thickness of the blade material, and may be determined experimentally. As well, the relief hole 22 provides flow conditioning, reducing tip turbulence.

The blade portions 12, 13 are each secured at their roots to the hub 15 or shaft or other base for operation. When the blade roots 14, 16 are secured to a shaft or hub the operational angle of incidence of the rotor blade 10 is established. The angle of incidence is meant herein (consistent with normal use of the term) as the angle between the plane of the rotor blade and the surrounding medium through which the blade travels. For purposes here, this can be measured as the angle between the blade portion considered and a plane transverse and perpendicular to the axis of rotation AR, which is presumed to be the central axis of the respective shaft or hub. The transverse plane is represented in the figure by the reference line T. The angle of incidence Ai is the same for both blade portions in the embodiment of FIG. 1. In prototype divided rotor blades, angles of incidence of up to 45 degrees were used successfully.

The rotor blade 10 is preferably formed from sheet steel that, as well as being readily formed into divided blade portions, allows the rotors to be secured to a steel shaft by standard welding methods. In FIG. 1 the rotor blade 10 is shown, for clarity, secured to a flat longitudinal surface of a polygon cross-section shaft. The shape and manner of attachment are not critical and other modes and devices are applicable.

The trailing blade portion 13 is substantially planar, although some bending in the proximity of the tip portion 11 will exist. The substantially planar trailing blade portion 13, without angled leading or trailing edge portions, reduces overall drag and turbulence without adversely affecting lift. The leading blade portion 12 has a narrow leading edge portion 18 bent and angled to provide a decreased angle of incidence at the leading edge. The leading edge portion 18 preferably extends forward from the leading blade portion 12 about 20 percent of the width or chord dimension of the leading blade portion 12, at a relative included angle of 45 degrees. The length and relative angle of the leading edge portion 18 may vary in some applications, and may be determined experimentally.

A series of ports in the form of through-holes 24 are located in the leading blade portion 12, behind (inward) and adjacent to the leading edge, on a longitudinal line. The function of the ports is a means of allowing high pressure fluid medium (e.g., air, water) to bleed from the bottom of the blade to the top, across the blade chord, thus reducing cavitation and turbulence, and delaying the onset of stalling, particularly when operating at high speeds and high angles of incidence. To reduce friction and pressure loss, the holes 24 should be bored at an angle from the leading edge and face of the rotor blade portion 12, rearward to the backside. For this reason, the holes 24 in FIG. 1a are seen as ellipses. The ports are a departure from the prior art and significantly increase the effectiveness of the rotor blade 10. Ports in the form of circular holes are effective and most easily and inexpensively formed, and are preferred for most applications. Ports having other geometries are also contemplated to provide the same function.

The holes preferably occupy 10 percent of the total top surface area of the rotor blade 10, exclusive of the leading edge portion 18, or any curved edge portion. The holes 24 should have sufficient diameter and area to bleed high pressure fluid in a nonturbulent flow, through the rotor blade, from the underside of the leading edge portion 12 to the upper side thereof. The combined number, size and spacing of the holes 24 (or other port element) will vary according to the size of the rotor blade 10 and the application and may be determined experimentally.

Figure 2:
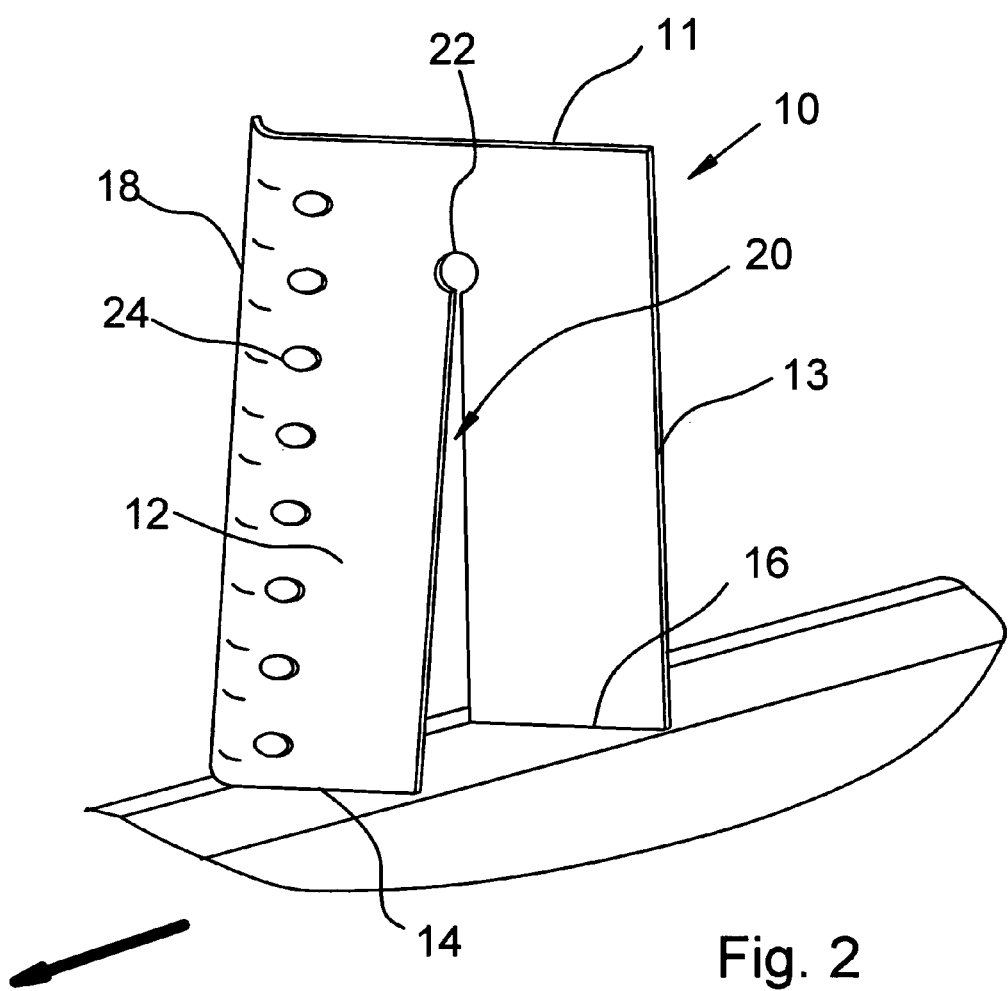
FIG. 2 is a perspective view of an alternative configuration of a preferred embodiment of the rotor blade having a curved leading edge blade portion.

In FIG. 2, an alternative configuration of the inventive rotor blade 10 includes a curved leading edge portion 25 that replaces the bent leading edge portion 18 discussed with respect to FIG. 1. In this configuration the curved leading edge portion 25 is smoothly curved into a decreased angle of incidence. This embodiment provides more lift with less drag than the bent leading edge portion 18.

In alternative configurations of the above embodiments, the blade tip portion 11 and the leading and trailing blade portions 12, 13 have conventional airfoil sections. Where different rates of airfoil curvature converge at the meeting of the tip portion and blade portions, they are blended and faired in the normal fashion. A divided blade using a conventional airfoil section is more complicated to manufacture, but is particularly effective in high-temperature applications where low drag is of great importance, and the rotor blade is not required to operate at high angles of incidence (e.g., turbojet engine). This embodiment, operating at conventional angles of incidence, may serve adequately without the leading edge ports discussed above.

It is contemplated, in alternative configurations of the invention, that leading edge ports can be combined advantageously with a divided rotor blade portion having a conventional airfoil section. In such an alternative configuration, the form and details of the holes are substantially as discussed above with respect to flat rotor blades.

Figure 3:
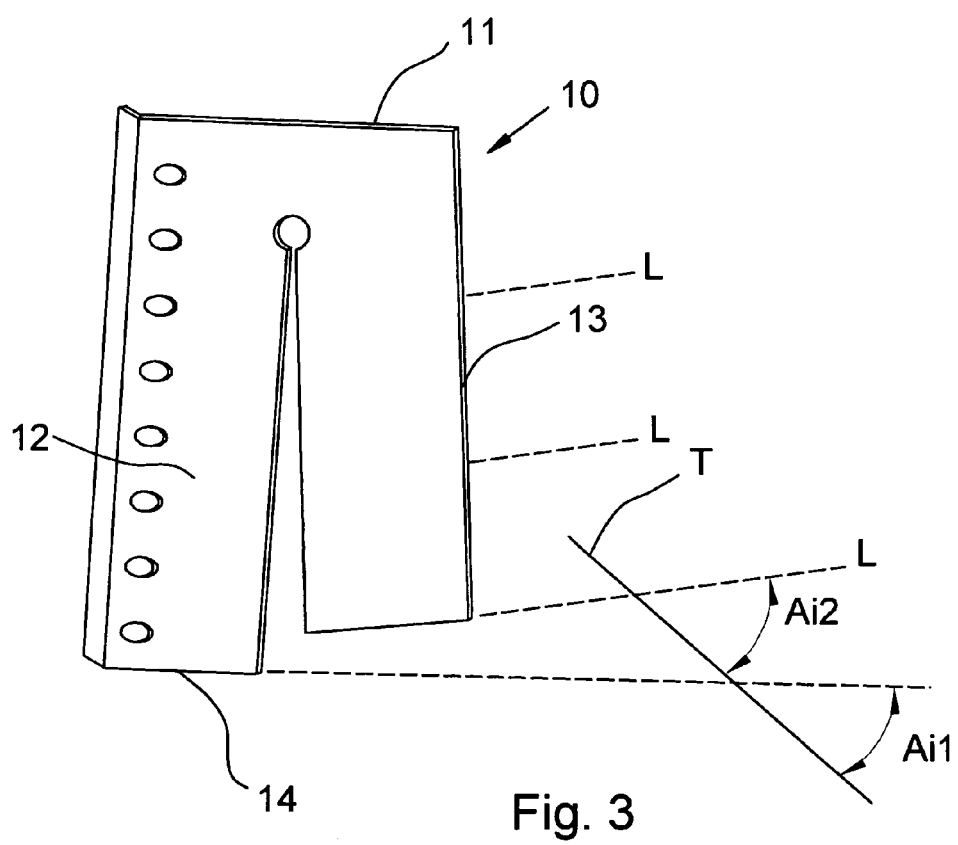
FIG. 3 is a perspective view of an alternative embodiment of the present invention in which the blade portions have dissimilar angles of incidence.

FIG. 3 is a perspective view of another embodiment of the present invention wherein the two blade portions 12, 13 have dissimilar angles of incidence. For clarity, the base hub is not shown. The trailing blade portion 13 has an angle of incidence Ai2 that is greater than the leading blade portion angle of incidence Ai1. In each blade portion, the respective angle of incidence is constant over the length of the blade portion. This is shown by the multiple coplanar extension lines L extending from the trailing blade portion. The increased angle of incidence of the trailing blade portion 13 may be obtained in a rotor blade formed of sheet metal by a twist or straight bend along an angled line at the junction of the trailing blade portion 13 and the tip portion 11. A slight area of transitional angles of incidence may result between the tip portion 11 and the trailing blade portion if a twist used as a transition. Preferably, the angle between the leading and trailing blade portions is about five degrees. That is, with respect to the figure: Ai2 minus Ai1 equals five degrees (Ai2−Ai=5). In this configuration, the trailing blade portion is more fully able to use the fluid flow that is redirected by the leading blade portion to create lift. The result is a small but a significant increase in the net lift produced by the rotor blade 10. A conventional airfoil section as discussed above may also be employed with the features of this embodiment.

The divided blade of the present invention may be employed to extract energy from a working fluid, as in the case of a windmill, or to create motion in a fluid by the application of energy, as in the case of crude oil moved by an impeller pump, or to generate motion through a fluid, such as air or water, by application of external power as in the case of a ship's screw or airplane propeller.

It is contemplated that the divided blade of the present invention may form a wing which may be advantageously used in a rotating application as a rotor or propeller. It is also contemplated that the present divided blade may be advantageously used in non-rotating applications such as fixed-wing craft, such as and airplanes and hydrofoils, and also as the wing of a rocket or other projectile. It may further be employed as a winglet at the tip of a conventional wing to extract energy from a wing tip vortex. The invention includes novel devices incorporating one or more rotor blades as disclosed.

Figure 4:
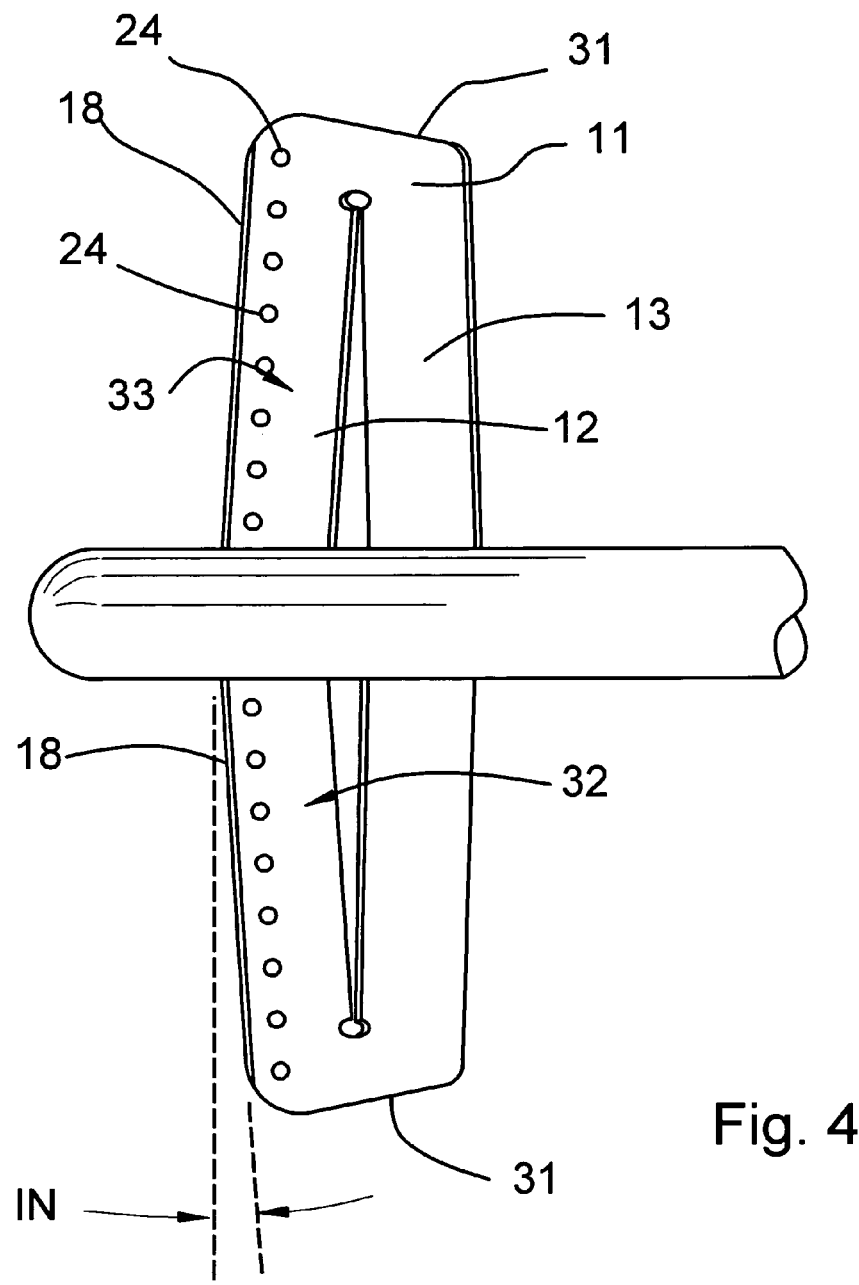
FIG. 4 is a side view of two rotor blades mounted on a shaft for use in the manner of an airplane propellor.

FIG. 4 depicts, by way of example, a two-bladed propellor designed in accordance with the invention and using the present rotor blades. In this application, two identical rotor blades 10 are mounted, as discussed above, on a shaft 30 in a configuration for use as a thrust generator in the manner of an airplane or boat propeller. The figure shows the device as viewed from a transverse side of the shaft 30, both the leading and trailing rotor blade portions being at an angle to the direction of view. For this reason, the port holes 24 are seen as circular due to their bore angle through the leading blade portion. To reduce turbulence and increase efficiency, the rotor blade corners are rounded and the tip edges 31 are cut back at an angle from the leading edge 18. In the figure, the leading edges 18 project either substantially toward or away from the direction of view (five degree angle of incidence) on the respective blades, and, consequently, their profiles are not visible. The leading edge 18 extends forward from the leading blade portion a length of 10 millimeters (mm).

The propeller blades in the configuration of FIG. 4 are each formed of 13 gauge (2 mm) sheet steel, each using a sheet blank of 400 mm. long by 200 mm. wide. Each blank is split and divided for 300 mm. of its length to form leading and trailing blade portions 12, 13. Port holes 24 have a diameter of 20 mm and are placed on 35 mm center spacing on a common line parallel to the leading edge. The holes are bored transverse to the blade portion, at an angle of 45 degrees, from behind the border of the leading edge on the bottom surface 32, rearward to the top surface 33 of the respective blade portion.

Note that the leading blade portion 12 is inclined on the shaft such that, when the blades are rotating on the shaft, the leading edge defines a cone. The inclination angle IN of the leading blade portion 12 is a product of the angle of incidence, the angle between the divided blade portions and the relative lengths of the blade portions. In the example design, the inclination angle IN is about 10 degrees. In many applications, an inclination angle of 10 to 15 degrees is preferred, although an inclination angle of up to 45 degrees may be used. To effect inclination angles of more than a few degrees, it is necessary to cut back, at an angle, the end of each rotor blade portion at its respective root to rake the blade backward, in the plane of the blade. This is most easily accomplished before the blank sheet material is divided.

The above propeller design would have a finished outside diameter of 850 mm and when turned at 2400 RPM, would develop over 200 pounds of static thrust. The required shaft power at 2400 RPM is expected to be 30 horsepower.

It is well known that conventional propeller blades are not well suited for operation at transonic and supersonic speeds. The United States National Aeronautics and Space Administration (NASA), for example, has characterized a "high-speed" propeller as one that can operate with tip speeds as high as Mach 0.9. As this limit includes the vector sum of the rate of propeller tip rotation, and the rate of travel of the propeller upon an aircraft, propeller-driven aircraft cannot achieve supersonic speed in level flight. This limitation is due almost entirely to the structural inadequacies of the conventional propeller, which, being unsupported along its length, is very subject to bending and twisting under the high loads encountered in the transonic and supersonic ranges. This results in violent fluttering and accelerated stalling, typically leading to rapid catastrophic failure of the propeller.

The divided blade of the present invention has increased support along its length by the separated blade portions and respective roots which increase the overall effective bending section to make the blade sufficiently rigid that it may be operated at transonic and supersonic speeds without fluttering.

Moreover, the divided blade of the present invention does not stall at high angles of attack, due in part to its rigidity, and in part due to the use of the leading edge holes. Conventional prior art propeller blades may operate efficiently at an angle of incidence in the range of six to 12 degrees, generally, and only in the range below transonic tip speeds. In contrast, the present divided blade may be operated effectively in many applications at an angle of incidence as high as 45 degrees at tip speeds well into the supersonic range.

Similarly, the exceptional rigidity of the present blade is of advantage in non-rotating applications, such as airplane wings. A straight-winged aircraft experiences extreme wing flutter in the transonic region, and is subject to sudden catastrophic structural failure. For this reason, modern supersonic jet aircraft employ delta wings, which are stronger over a given span, but which have greatly inferior low-speed performance. The lack of lift at low speeds, particularly during landing, is of such significance that supersonic aircraft have been designed at great expense with wings that move between delta and straight configurations, according to the speed of flight. Additionally, the high angle of incidence characteristic of the divided blade of the present invention, coupled with its high stall resistance, produces a higher lift for a given wing area, permitting the use of smaller wings for a given payload. This results in greater aircraft maneuverability and lowers the cost of construction.

While the above examples have discussed steel as a material of construction for the present divided blade, other materials having sufficient strength, toughness and stiffness may also be used. In constructions using other than easily plastically formed steels, other methods of construction are contemplated and the method of construction does not influence the function of the invention as shown and discussed.

The invention includes methods of forming a rotor blade from sheet material consistent with the constructions discussed above.

The preceding discussion is provided for example only. Other variations of the claimed inventive concepts will be obvious to those skilled in the art. Adaptation or incorporation of known alternative devices and materials, present and future is also contemplated. The intended scope of the invention is defined by the following claims.

I claim:

1. A blade for operating in a relatively moving fluid medium comprising:

a blade tip;

first and a second blade portions extending divergingly from the blade tip to respective blade roots, each blade root separated from the other, such that an angled gap is defined between the blade portions;

the first blade portion having a leading edge and a plurality of through-blade bleed ports adjacent the leading edge.

2. A blade according to claim 1 and wherein:

the blade portions and tip have a common uniform thickness.

3. A blade according to claim 2 and wherein:

the blade portions have respective angles of incidence, the first blade portion angle of incidence different from the second blade portion angle of incidence.

4. A blade according to claim 3 and wherein:

the second blade portion angle of incidence is five degrees greater than the first blade portion angle of incidence.

5. A blade according to claim 4 and wherein:

the first blade portion angle of incidence is less than or equal to 45 degrees.

6. A blade according to claim 1 and wherein:

the blade portions extend divergingly from the blade tip at an included angle of 20 degree.

7. A blade according to claim 1 and wherein:

the bleed ports have a total effective area of ten percent of the first blade portion surface area.

8. A device for moving fluid, comprising:

at least two rotor blades oriented symmetrically about a central axis of a rotatable base;

each rotor blade comprising:

a blade tip;

first and a second blade portions;

the blade portions extending divergingly from the blade tip to respective blade roots that are axially separated and secured to the rotatable base such that an angled gap is defined between the blade portions;

each first blade portion also having:

a leading edge portion extending, at decreased angle of incidence, from the first blade portion, and and a plurality of bleed ports adjacent the leading edge.

9. A device according to claim 8, and wherein:

each rotor blade first blade portion has an angle of incidence equal 45 degrees.

10. A device according to claim 8, and wherein:

the first blade portion having a first angle of incidence and the second blade portion having a second angle of incidence different from the first.

11. A device according to claim 10, and wherein:

the second angle of incidence is five degrees greater than the first angle of incidence.

12. A device according to claim 8, and wherein:

the base is an aircraft propeller shaft.

* * * * *